United States Patent [19]
Porter et al.

[11] 3,801,370
[45] Apr. 2, 1974

[54] SINK-FLOAT LIQUID CONTACTING OF SOLIDS

[75] Inventors: Harold Felton Porter, Hockessin; Foster Wilson Rennie, Wilmington, both of Del.; Addison Heaton Williamson, Beaumont, Tex.

[73] Assignee: E. I. du Pont de Nemours and Company, Wilmington, Del.

[22] Filed: Nov. 10, 1971

[21] Appl. No.: 197,445

[52] U.S. Cl................. 134/25 R, 134/26, 134/69, 134/79, 23/270 R, 23/310, 209/159, 209/13, 209/465
[51] Int. Cl........................................... B01d 11/02
[58] Field of Search.......... 23/309, 310, 270 R, 285, 23/288; 209/159, 158, 13, 454, 465; 259/7, 8; 134/25 R, 69, 26, 79

[56] References Cited
UNITED STATES PATENTS

| | | | |
|---|---|---|---|
| 1,231,707 | 7/1917 | Christensen | 23/270 |
| 3,390,402 | 6/1968 | Goerg | 23/270 R |
| 2,276,298 | 3/1942 | Frazier | 23/270 R |
| 2,558,408 | 6/1951 | Zies | 23/270 R |

FOREIGN PATENTS OR APPLICATIONS

| 59,120 | 12/1890 | Germany | 209/159 |
|---|---|---|---|

*Primary Examiner*—Norman Yudkoff
*Assistant Examiner*—S. J. Emery

[57] ABSTRACT

A method and apparatus for contacting two miscible liquids with solids using the sink-float technique wherein there is obtained substantial transfer of the solids from one of the liquids to the other liquid.

1 Claim, 1 Drawing Figure

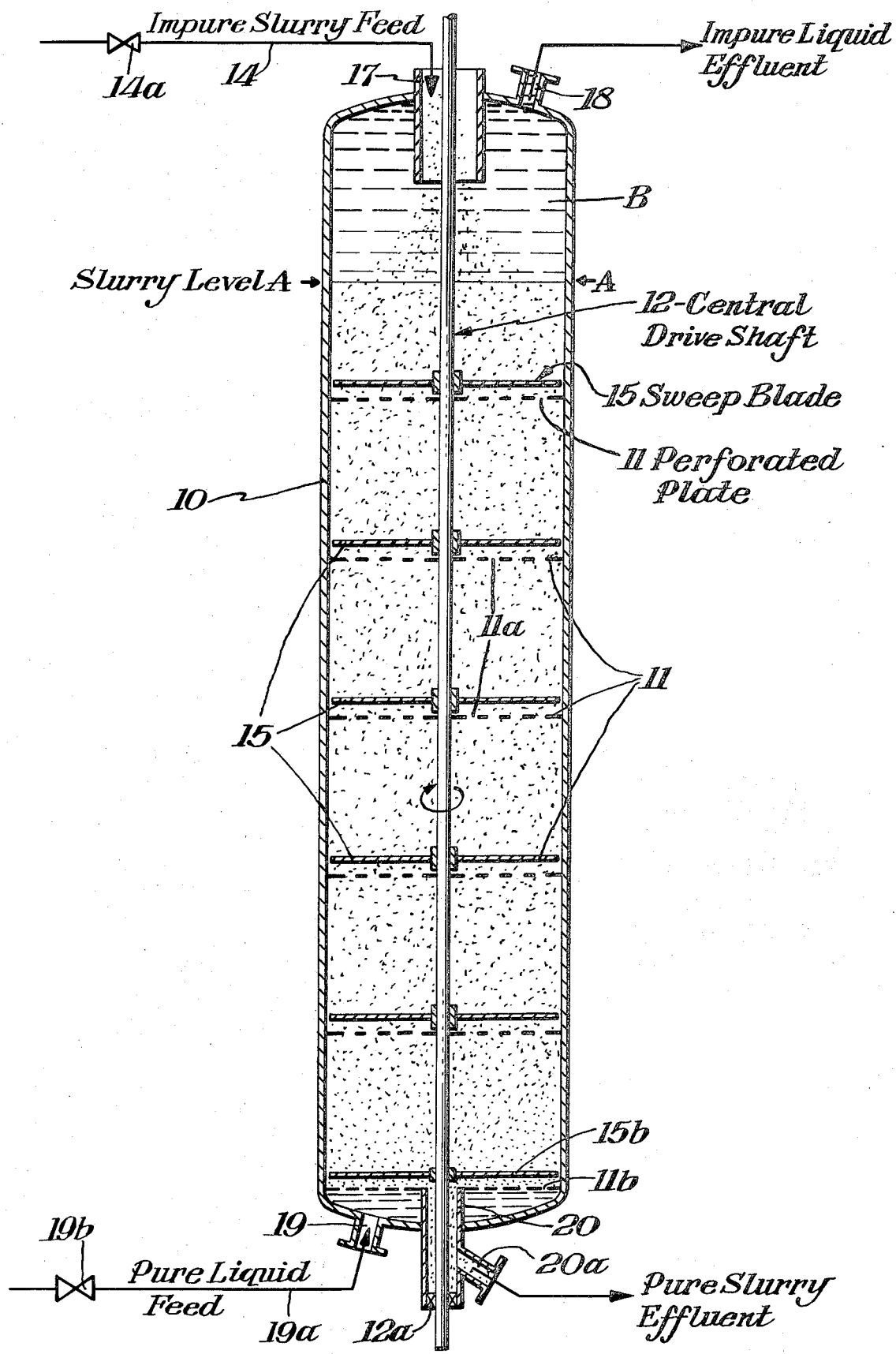

SINK-FLOAT LIQUID CONTACTING OF SOLIDS

BRIEF SUMMARY OF THE INVENTION

Generally, this invention comprises a method of, and apparatus for, contacting two miscible liquids with solids using the sink-float technique comprising utilizing a generally vertical column provided with a plurality of superposed transverse plates having apertures therethrough of a size permitting ready transit of the solids and the liquids, introducing the solids in mixture with a first of the liquids at a first preselected level in the column effecting sink-float transit of the solids lengthwise of the column and through the apertures of the plates, sweeping the solids inlet sides of the plates with slowly rotating sweep arms disposed at relatively close clearances with respect to the apertures in the plates, introducing the second liquid at a second preselected level in the column spaced lengthwise of the column from the first preselected level in the direction of sink-float transit of the solids, and drawing off the solids mixed with liquid constituting the bulk of the second liquid together with a relatively minor portion of the first liquid as a first discharge stream from the solids sink-float progression end of the column while drawing off liquid constituting the bulk of the first liquid together with the remainder of the second liquid as a second discharge stream from the end of the column opposite lengthwise from the solids sink-float progression end.

DRAWINGS

The single drawing FIGURE, consisting of a partially schematic vertical side elevation sectional view, illustrates a preferred design of column according to this invention wherein the solids have a greater density than the liquids, so that the solids transit is downwardly by a sinking action.

DETAILED DESCRIPTION

Referring to the FIGURE, the apparatus therein shown can be used for a great number of liquid contacting operations wherein the objective is to contact solids fed in as a slurry in one liquid, hereinafter referred to as the "first liquid," with another liquid, hereinafter referred to as the "second liquid," and effectively transfer the solids from the first liquid to the second liquid while securing very intimate and extensive contact of the solids with the second liquid.

The two liquids are assumed to be miscible one with the other and can, in fact, typically both consist of water as the liquid component, except that one of the liquids differs from the other in solute content.

Also, each liquid can, in fact, be a mixture of two or more miscible liquids, which it is convenient to regard as a single liquid, because the mixtures behave exactly like single liquids for the purposes of this invention. An example of such a liquid is commercial xylol, which is a mixture of the three xylene isomers. Another such liquid is a mixture of ethanol and water.

For the design hereinafter detailed, the particulate solid to be contacted is assumed to have a density greater than that of the first and second liquids, so that solids progression through the column is by gravitational settling, or "sinking", as opposed to the opposite condition for particulate solids of density less than the two liquids, where progression through the column is by upward flotation, the invention being equally applicable to both situations subject to relatively minor apparatus alterations.

A preferred apparatus comprises a vertically disposed cylindrical column 10 provided with a multiplicity of superposed perforated plates 11. A central drive shaft 12, journaled in bearings at top and bottom, of which only the lowermost 12a is depicted in the drawing, is disposed along the column longitudinal axis. Closely adjacent the top face of each plate, there is provided a rotary sweep blade 15, keyed or otherwise secured to shaft 12. In large diameter columns, simple conventional seals can be provided to prevent bypassing of liquid between shaft 12 and plates 11.

The apertures 11a in plates 11 are preferably round holes disposed uniformly at equilateral triangular spacings over the entire areas of the plates, for convenience in fabrication. The aperture diameters must be a number of times larger than the average particle screen size, e.g., 5 to 200 times, in order to avoid bridging. In general, the apertures can be relatively smaller where free-flowing spherical particles are involved, whereas needle-like, plate-like or stringy particles require relatively larger size apertures. It is preferred to determine appropriate aperture size by experimentation or analogy with known cases.

We have found that, generally, aperture diameters greater than about 20 times the average particle screen size insure good transit of particles through plates 11. Aperture diameter about 15 times the particle size operated somewhat less well. For needlelike gypsum crystals of 33–73 microns particle screen size, ¼ inch diameter holes 11a gave good operation. Very large holes tend to permit more back-mixing. Too small a hole has a tendency to plug by bridging.

The following Table I summarizes design experience acquired with respect to two different particulate solid materials to be processed as regards aperture (hole) 11a size in relationship to particle size in $\mu$m (i.e., micro-meters) expressed as a multiple of particle size (e.g., the 1 percentile fraction of largest particle size) and also of plate free area (i.e., the summation of hole 11a areas on any given plate 11 divided by the total area of the plate). Average particle screen size was determined by a dry solids sieve analysis wherein the screen set was vibrated for approximately 15 minutes before determination of the respective solids percentage retentions. It will be understood that needle-like particles are frequently retained on screens much coarser in mesh size than their respective thickness dimensions, since transit through the screens depends on at least temporarily upending individual particles so that they clear the screens endwise. However, statistically, screen analyses made in this manner are quite consistent and reproducible.

Inlet line 14, provided with throttling valve 14a, supplies the raw feed of particulate solids as a slurry in mixture with the first liquid via sleeve 17, preferably disposed substantially concentric with shaft 12. Off-center exit 18 at the top of the column is the discharge port primarily for the first liquid effluent removed from the solids. Inlet connection 19 at the lower end of column 10 is the supply port for the second liquid, which can typically be a wash liquid such as pure water, for example. Sleeve 20, preferably substantially concentric with shaft 12, opening through the top side of the lowermost plate, 11b, is provided with a draw-off 20a

TABLE 1

| Process | Solids Screen Analysis | | Plate Hole Diameter | Hole Size Multiple of 50% Size Particles | Hole Size Multiple of 1% Larger Sized, Particles | Plate Free Area % | Solids Transfer Results |
|---|---|---|---|---|---|---|---|
| Transfer gypsum from organic solution to water | 1% > | 100 μm | ¼ in. | 127 | 64 | 10 | Excellent |
| | 10% > | 73 μm | 5/16 in. | 163 | 81 | 10 | Excellent |
| | 50% > | 50 μm | | | | | |
| | 90% > | 33 μm | 5/16 in. | 163 | 81 | 16 | Occasional excursions from generally excellent results |
| | | | ½ in. | 254 | 132 | 10 | Unsatisfactory |
| | | | 1½ in. | 752 | 376 | 37 | Unsatisfactory |
| Transfer polymer chips from one organic solution to another | 1% > | 1080 μm | ⅝ in. | 18 | 8.8 | 10 | Excellent but solids handling capacity was low. |
| | 10% > | 820 μm | | | | | |
| | 50% > | 520 μm | | | | | |
| | 90% > | 330 μm | | | | | |
| | | | 9/16 in. | 27 | 14 | 21 | Excellent |
| Transfer polymer chips from organic solution to pure solvent | 1% > | 860 μm | | | | | |
| | 10% > | 600 μm | | | | | |
| | 50% > | 360 μm | 9/16 in. | 39 | 17 | 21 | Excellent |
| | 90% > | 220 μm | | | | | | through which the solids product admixed primarily with the second liquid, in this case pure water, is removed.

The lowermost plate, 11b, is not intended to pass solids but is solely a liquid distribution plate for introducing liquid as uniformly as practicable across the entire column cross-section. Accordingly, this plate is provided with relatively small diameter holes barring solids passage therethrough. The number of these holes is, typically, chosen to give from 5–10 inches $H_2O$ pressure drop across plate 11b for the operating conditions to be maintained.

A rotary sweep blade 15b is particularly essential for lowermost plate 11b, not only to maintain solids in uniform suspension for draw-off via sleeve 20 but also to safeguard against particle settling in peripheral regions.

In the test apparatus hereinafter described, central shaft 12 was not extended concentrically through sleeve 20; however, this is a desirable design feature, in that the rotating shaft reduces the tendency for solids plugging in the exit passage.

In operation, it is preferred to maintain the slurry input level somewhat above the topmost plate 11, in order to utilize all of the plates efficiently. Thus, the level A—A is very satisfactory for a great number of operations, this being about one plate pair spacing above topmost plate 11. Additional head volume B, equivalent to about one to several times a plate-to-plate intervolume, is desirable to provide ample disengagement volume for the bulk of the first liquid admixed with a relatively minor portion of the second liquid as a discharge stream removed via liquid effluent exit 18.

Column operation is readily controlled by slurry charge maintenance within column 10 between preselected limits with respect to level line A—A, as determined by a conventional radiation gage, or the like. It is also essential to maintain a perceptible upward flow of wash (second) liquid at all times. Thus control during operation is effected by appropriate adjustment of valve 14a in impure feed supply line 14, and also of valve 19b in the supply line 19a connected in circuit with wash liquid inlet 19.

It is sometimes advantageous to expand the column head volume above the topmost plate to provide additional liquid calming volume, and this is readily accomplished by increasing the column diameter to 1.5 to 2.0 times the lower column diameter (not shown in the FIGURE).

There is no difference in principle as regards operation with floating or sinking solids. In both cases, the cause of particle motion is the difference in density of the solids and the liquids in which they are immersed. Restrictions to particle movement in both instances are due to particle size and shape, and liquid viscosity.

Stokes Law (refer Perry's Chemical Engineering Handbook, 3rd Ed., p. 5–59) permits computation of particle settling velocities for small spherical particles dispersed in dilute concentrations in liquids. However, for shapes other than spheres, it is necessary to apply correction factors reducing the calculated terminal velocities. Moreover, in column operation according to this invention, the particle concentrations are so great that the motions of single particles are severely reduced. Thus, the Stokes relationship predicts only the direction of motion (which is observable in any case), and the approximate rates compared with other particles of similar sizes and shapes, such as, for example, chips compared with chips, needles with needles, and spheres with spheres.

Sink-float processing of solids according to this invention is practicable for all situations, except where very small size particles are involved or where there is only a relatively small density difference between the solids and the liquids, or where the liquid viscosity is high. Under these circumstances the solids settling (or rising) rate is so slow that operation becomes uneconomical, because the column required becomes too large.

Analysis of the operation of the apparatus described according to this invention is believed to explain the liquid-to-liquid transfer process involved as follows:

Impure feed slurry, i.e., first liquid plus solids, enters the top of column 10 where it settles to a predetermined level (e.g., A—A). A counterflow of pure (second) liquid enters at the base of the column in sufficient quantity to transport solids exiting via draw-off 20a plus providing a flow of pure (second) liquid up the column counter to the downward flow of solids, thereby displacing the impure (first) liquid which exits free of solids via discharge port 18.

For optimum washing operating, in an open column having no plates, it is necessary to control the upflow of pure (second) liquid and the downflow of particulate solids so as to produce a state of incipient fluidization such that gross mixing does not occur but that a fluidized state does barely exist, i.e., the particles are supported by the viscous drag of the (second) liquid. Wherever the relative flows of solids and liquids are not sufficient to maintain fluidization, the solids act as a packed bed and uniform flow of liquids is difficult to obtain, resulting in stagnant zones. Wherever more than incipient fluidization is attained, backmixing occurs. In either case, the transfer of solids from one liquid to another is very inefficient and, consequently, impractical.

The incorporation of perforated plates 11 alone (i.e., without sweep blades 15) in the column reduces backmixing to some degree. However, since the slurry in the column must be maintained near incipient fluidization to achieve uniform flow and, since the column cross-sectional area is restricted at each plate, solids and liquid cannot flow simultaneously through a given plate aperture. Consequently, some of the apertures in a given plate experience an upflow of slurry and some a downflow at any given moment, this phenomenon occurring in a random manner. The result is considerable back-mixing of liquids and solids, but usually an improvement over an open column, except possibly in cases where the settling rate of the solids is very high.

It has been observed that semi-permanent channeling of liquid occurs where very fine, slow-settling particulate solids are processed, particularly with solids of abnormal dimensions, such as flat plates or needle-like shapes. This defect is effectively eliminated by slow-moving sweep blades 15 disposed closely adjacent (e.g., ¼ inch to 1.5 inch above) plates 11.

The unexpected effect of the swept plate is the obtainment of a systematic flow of solid particles downward and liquid upward, thereby greatly reducing back mixing. It has been observed that the normal flow through a given aperture 11a is essentially clear (second) liquid flowing upward. As sweep blades 15 approach the apertures in the course of their rotation, very thick slurry is moved over the apertures, and heavy slurry thereupon flows downwardly as the blade passes. After the passage of blade 15, the hole reverts to its normal state of upward flow of essentially clear liquid.

Another unexpected benefit of the swept plate column is improved stability and ease of control. Thus, it is no longer essential that exact incipient fluidization be precisely maintained and it is possible to tolerate a somewhat greater degree of solids fluidization without bad effects. Possibly more important, it is practicable to operate the column with a settled bed, i.e., nonfluidized state. This is so because the sweep can be adjusted to break up channeling and achieve uniform flow of solids downward and liquid upward. This effect is particularly advantageous for needle-like or plate-like particles, which do not fluidize readily or uniformly.

In summary, the advantages of the swept plate column of this invention are as follows:

1. The range of practical applicability can be extended to smaller particle size solids as well as to solids of unusual shape which have poor settling characteristics.
2. Backmixing is drastically reduced in most applications.
3. Column operation is stable over a much wider range of flow conditions without reducing displacement efficiency.
4. Reduction in solids flow can be achieved without a corresponding increase in pure (second) liquid flow. In fact, (second) liquid flow can actually be decreased, i.e., the turndown characteristics are greatly enhanced.

In general, the following are apparatus operating and design variables:

1. Fractional open area of plates 11 – 5 to 50 percent, but preferably 10–20 percent.
2. Hole size of perforated plates - Determined by particle size processed. ¼ inch to ½ inch diameter apertures are good for a wide range of conditions.
3. Sweep blade 15 size and shape. Circular rods have been employed, also tapered blades. The blades can have more than two arms, if desired.
4. Sweep blade 15 speed — 20 to 30 rpm with four sweep bars per plate was too fast for 33–73 micron gypsum in a 6 inch diameter column, whereas ¾ rpm was the slowest speed determined, due to limitations of test equipment.
5. Plate spacing: 3 inch diameter column, 4 inch spacing; 6 inch diameter column, 6 inch spacing; 12 ft. diameter column, 12 inches or greater spacing.

The following comparative examples are reported:

EXAMPLE I

Column: 6 inch diameter glass construction provided with 8 metal plates at 6 inch spacings, column expanded to 9 inch diameter above topmost plate. Raw feed inlet 17 was 2 inch diameter and extended 4 inches into the column. All of the plates were provided with a single 4 inch diameter hole at the center, giving 44 percent open area. No sweep blades 15 were employed.

The feed material was a 20 percent by weight gypsum slurry of particle size range 10 percent larger than 73 $\mu$m, 50 percent larger than 49 $\mu$m, and 90 percent larger than 33 $\mu$m, formed by lime neutralization of sulfuric acid solution of organic material. The organic material was valuable and was present at approximately 12 percent concentration in the (first) liquid. In addition, it was desired to remove organic material to avoid pollution problems. The organic material was to be removed by contact with fresh water.

Results: Solids rate = 10 lbs./hr., wash water rate = 5 lbs./hr. up the column.

Many small channels of liquid were observed in the bed and there was much mixing from top to bottom. Excessive organic material (i.e., 7 percent on the solids basis) was present in the solids withdrawn from the bottom of the column. Additional runs at higher and lower rates all produced unsatisfactory results.

EXAMPLE II

Column: Identical with Example I, except that the plates were each provided with sixty-one ¼ inch circular apertures equally spaced on equilateral triangles, giving a free area of 11 percent.

Feed Material: Same as Example I. Solids rate down the column — 5.8 lbs./hr. Water rate up the column — 2.5 lbs./hr.

Results: Occasional channels about ½ inch diameter appeared and persisted for periods of up to about 15 minutes. The washed slurry removed via draw-off 20a analyzed 25% gypsum and about 1.5 percent organic material, solids basis.

EXAMPLE III

Column: Same as Example II, except that the number of plates was increased to 12 in number by adding additional plates and column height.

Feed: Same as Example II.

Results: Same as Example II, except that the organic level was somewhat reduced in the solids exiting from the bottom of the column, analyzing 1.2 percent on the solids basis.

EXAMPLE IV

Column: Same as Example III, except that a motor-driven shaft 12 was run down through the center holes of the 12 plates, reducing the aperture numbers to 60 per plate. Four sweep bars ¼ inch diameter and clearing the inside column periphery by one-sixteenth inch and the associated plates by three-eighths inch were fixed to the shaft at 90° intervals around the periphery just below and just above each plate.

Feed: Same as Example II.

Results: When the sweep bars were rotated at 5–15 rpm the channels noted in Example II no longer occurred. The concentration of organic material in the solids slurry exiting from the bottom of the column was 0.0175 percent, solids basis.

A second test run employing a 0.75 rpm sweep speed gave essentially the same results. It was observed that the sweep bars just below the several plates had no discernible effect on operation in either run.

EXAMPLE V

Column: 3 inch diameter, provided with 7 plates spaced 4 inches apart. The top of the column extended 10 inches above the top plate. Each plate had six 9/16 inch diameter holes uniformly spaced thereover, giving a free area of 21 percent. A 1 inch diameter feed tube extended 4 inches into the top of the column. A motor-driven shaft was run down axially of the column through central holes drilled in line through all of the plates and two sweep bars ⅛ inch diameter 180° apart and extending to within one-sixteenth inch of the column inside wall were attached to the shaft at a clearance of ¼ inch above each plate.

Feed: The particulate solids fed was granular polymer which was swollen with 1 lb. of solvent A per lb. of polymer. The particles were irregular discs sized as follows:

| | | | |
|---|---|---|---|
| larger than | | 200 microns | 98% |
| do. | do. | 400 do. | 80% |
| do. | do. | 600 do. | 42% |
| do. | do. | 1000 do. | 2% |

Solvent A was to be extracted by contact with solvent B, which did not swell the polymer.

In order to reduce the concentration of solvent A, the solvent A-polymer mixture was diluted with 0.91 lb. of solvent B per lb. of polymer before the slurry was fed to the column. The several existing densities were: solvent A 1.00 g/cm$^3$, solvent B 0.80 g/cm$^3$, swollen polymer density 1.2 g/cm$^3$, unswollen polymer density 1.4 g/cm$^3$ and solvent B viscosity 1.2 cp.

Results: Polymer rate down column 14.3 g/min.
Overflow rate via effluent exit 18: 43.0 g/min.
Sweep rate: 11–12 rpm.
Solvent B rate up column: 30.9 g/min.
Concentration of A in overflow via effluent exit 18: 33 percent, balance solvent B.
Concentration of A in underflow solids discharged via bottom draw-off 20a: 0.09 percent.

EXAMPLE VI

Column: Same as Example V

Feed: Granular polymer material. The particles were coated with a soluble material which it was desired to remove with solvent C. The coating was 9% of the total dry weight. The particles were irregular discs having the following size distribution:

| | | |
|---|---|---|
| smaller than | 150 microns | 2% |
| do. | 300 do. | 39% |
| 18do. | | |
| do. | 600 do. | 90% |
| 18do. | | |
| do. | 900 do. | 98.5%. |
| 18do. | | |

Particle density 1.4 g/cm$^3$. Solvent C density 0.89 g/cm$^3$. Solvent C viscosity 0.5 cp.

Results: Polymer rate 37.4 g/min.
Overflow rate via effluent exit 18: 45.0 g/min.
Sweep rate: 11–12 rpm
Solvent C rate up column: 41.6 g/min.
Concentration of solubles in overflow via effluent exit 18: 7.6%
Concentration of solubles discharged via bottom draw-off 20a, drained and dried — 0.036 percent.

The foregoing examples have all involved particulate solids of greater density than the contacting liquids, so that transit through the plate apertures was by gravitational settling, or sinking. For the situation where the particulate solids have a lower density than the contacting liquids, transit through the plate apertures is by flotation, so that the granular solids introduction would be via inlet 19 with take-off via exit 18, whereas the first liquid primary exit would be via draw-off 20a and the second liquid introduction would be via inlet 17, with primary discharge via effluent exit 18. For flotation of solids operation the solids inlet sides of plates 11 are the undersides, as seen in the FIGURE, so that it is necessary to shift the positions of sweep blades 15 from adjacent the tops of the plates 11 to adjacent the plate undersides.

The foregoing examples largely concerned inert solids; however, this invention is also well-suited to use with solids which take active parts in separations conducted within column 10, typical examples being ion exchange resins, absorbents, adsorbents and the like. In fact, any solids operation wherein intimate and prolonged contact with two different liquid components is advantageous, with transfer from one liquid component to the other, can be effected by this invention efficiently and economically.

The apparatus of this invention can be most advantageously coupled with other operational equipment requiring feed of solids in slurry form, e.g., crystallization before or after processing in our apparatus, or processing in the inventive apparatus followed by disposal in a bio-degradation pond. It is also applicable when the next step for solids processing is drying, if a subsequent filter operation is coupled in series to enhance the washing effect of the column. In this case liquid supplied as wash to the filter can be thereafter used as the second liquid feed to the column.

What is claimed is:

1. The method of contacting two distinct miscible liquid inputs with solids using the sink-float technique consisting of utilizing a generally vertical column provided with a plurality of superposed transverse plates having a plurality of uniformly distributed apertures therethrough of a size permitting ready transit of said solids and said liquids, introducing said solids in mixture with a first of said liquids at a first preselected level in said column effecting substantially vertical sink-float transit of all of said solids lengthwise of said column and through said apertures of said plates, sweeping the solids inlet sides of said plates with slowly rotating sweep arms disposed at relatively close clearances with respect to said apertures in said plates, introducing the second of said liquids at a second preselected level in said column spaced lengthwise of said column from said first preselected level in the direction of said sink-float transit of said solids, said rotating sweep arms periodically impelling said solids through said apertures from said solids inlet sides of said plates while permitting substantially unimpeded counter current passage of said second of said liquids through said apertures at all other times, and drawing off said solids mixed with liquid constituting the bulk of said second liquid together with a relatively minor portion of said first liquid as a first discharge stream from the solids sink-float progression direction end of said column while drawing off liquid constituting the bulk of said first liquid together with the remainder of said second liquid as a second discharge stream from the end of said column opposite lengthwise from said solids sink-float progression direction end.

* * * * *